United States Patent [19]

Plancon

[11] Patent Number: 5,059,840
[45] Date of Patent: Oct. 22, 1991

[54] STATOR ASSEMBLY FOR A TIMEPIECE STEPPING MOTOR

[75] Inventor: Michel Plancon, Besancon, France
[73] Assignee: Timex Corporation, Waterbury, Conn.
[21] Appl. No.: 645,759
[22] Filed: Jan. 25, 1991
[51] Int. Cl.⁵ .................. H02K 37/00; G04C 5/00
[52] U.S. Cl. .................. 310/49 R; 310/40 MM; 310/254; 310/43; 310/90; 368/155
[58] Field of Search .......... 310/49 R, 40 MM, 162, 310/163, 164, 83, 43, 218, 42, 254, 90, 36; 368/163, 162, 160, 155, 156, 157

[56] References Cited
U.S. PATENT DOCUMENTS

| | | | |
|---|---|---|---|
| 3,949,251 | 4/1976 | Takatsuki | 310/49 R |
| 3,978,651 | 9/1976 | Yoshino | 310/40 MM |
| 4,270,066 | 5/1981 | Terade et al. | 310/40 MM |
| 4,342,930 | 8/1982 | Pellaton | 310/49 R |
| 4,398,107 | 8/1983 | Fukushima | 310/49 R |
| 4,725,749 | 2/1988 | Wuthrich | 310/49 R |
| 4,912,832 | 4/1990 | Egger et al. | 310/40 MM |

Primary Examiner—R. Skudy
Assistant Examiner—E. To
Attorney, Agent, or Firm—William C. Crutcher

[57] ABSTRACT

Briefly stated, the invention comprises an improved stepping motor and method of making it including locating it in the timepiece frame, the stepping motor including a rotor and a stator. A flat magnetizable stator member defines a central opening with diametrically opposed narrow sections on either side of the opening, a non-magnetic bushing disposed in the opening and secured to the surface of the stator member. The bushing has diametrically opposed cut-out portions aligned with the narrow sections. The narrow sections are severed to separate the stator into two pole shoes which are retained in position by the bushing. The severing is preferably by laser, but may includes sawing or other severing methods. The pole shoes of the stator member are then attached to the timepiece frame plate. The stepping motor rotor is journalled in bores formed in the frame and bushing.

7 Claims, 4 Drawing Sheets

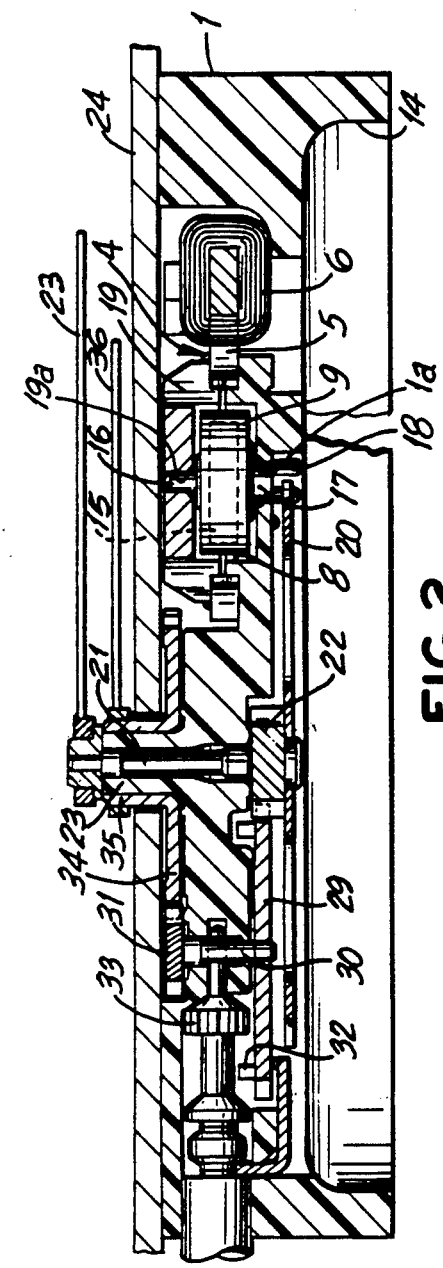
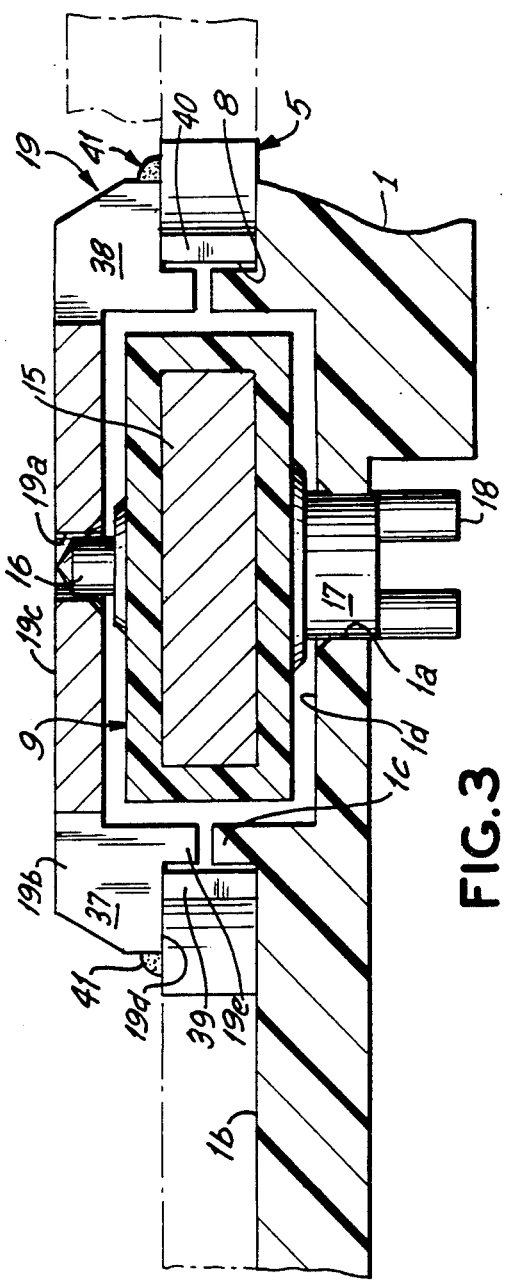
FIG.2
FIG.3

STATOR ASSEMBLY FOR A TIMEPIECE STEPPING MOTOR

This invention relates generally to a stepping motor for a quartz analog timepiece. More particularly, the invention relates to an improved stepping motor stator assembly and method of making it.

BACKGROUND OF THE INVENTION

Electronic timepieces of the "analog" type, i.e., having conventional rotating hands, have been developed wherein a stepping motor is accurately driven from a time based electrical driving signal. The driving signal may come from a transistor pulse-producing circuit or from an integrated circuit having a quartz oscillator time base.

A stepping motor has a rotor with a pinion connected through a gear train to drive the hands of the timepiece. The stepping motor also has a stator assembly which is attached to the frame plate of the timepiece, a coil connected to receive current pulses from an integrated circuit, and various members of magnetizable material, including a core disposed inside the coil and pole shoes defining a circular opening within which the stepping motor rotor is disposed. The pole shoes usually define diametrically opposed notches, or are offset slightly from one another, to cause the rotor to assume a stable position between steps. The proper positioning of the stator pole shoes with respect to the rotor is extremely important for proper operation of the stepping motor. Several approaches have been used to position the stator pole shoes with respect to the rotor.

One solution is to employ a "one-piece" stator member, wherein the pole shoes are connected by diametrically opposed narrow sections, such as disclosed in U.S. Pat. No. 4,398,107-Fukushima issued Aug. 9, 1983. Another example of a one-piece stator member is shown in U.S. Pat. No. 4,270,066 issued to Terade, et al on May 26, 1981. In the latter patent, a non-magnetic reinforcing ring is employed to add additional stiffness to the one-piece stator because of the narrow sections around the stator hole. The non-magnetic reinforcing ring is disposed within the hole and has an outer diameter effective to insure a snug fit, with a circumferential side wall defining the hole through the stator. The stepping motor rotor is separately mounted to rotate within the reinforced opening, and the one-piece stator member is separately secured to the movement frame plate. A similar non-magnetic reinforcing ring pressed into the opening of a one-piece stator is shown in U.S. Pat. No. 4,342,930 issued Aug. 3, 1982 to Pellaton. In this case, the reinforcing ring is further provided with a central opening which supports one of the bearings for the stepping motor rotor.

A second approach to the general problem of locating the stator pole shoes with respect to one another and with respect to the rotor involves utilization of the frame plate and/or members secured in the frame plate to locate both the rotor and the stator pieces. One such arrangement is shown in U.S. Pat. No. 3,949,251-Takatsuki issued Apr. 6, 1976, wherein a support ring containing one of the stepping motor bearings is used as a stop for positioning tips of the stator pole shoes, which are made movable for this purpose. A related approach is seen in U.S. Pat. No. 4,725,749 issued Feb. 16, 1988 to Paul Wuthrich and assigned to applicant's assignee, wherein the two stator pole shoes are disposed in recesses formed in the frame plate and properly positioned by wedges or other means causing them to abut a wall formed around an opening housing the rotor.

Yet a third approach is shown in U.S. Pat. No. 3,978,651, issued Sept. 7, 1976 to Yoshino wherein a pair of stator yokes are permanently mounted to a reference plate, the latter being separately mountable on the watch frame plate. The two stator yokes may be formed from a single element by cutting apart by sawing or the like at diametrically opposed locations after they are mounted on the reference plate.

An improved method for making a timepiece stator is disclosed in U.S. Pat. No. 4,912,832 issued Apr. 3, 1990 to Egger, et al and assigned to applicant's assignee. A unitary stator member in this case is first secured to the timepiece frame member with two diametrically opposed narrow sections spanning two holes provided in the frame member. The narrow sections are severed with a laser to provide two separate pole shoes properly aligned by having been previously secured to the frame plate as a one-piece member. While the laser-cut stator is a significant improvement, it would be desirable to have a separate sub-assembly which provides the same advantages, but which can be prepared before assembling to the frame.

Accordingly, one object of the present invention is to provide an improved stator assembly for a stepping motor and method of making it.

Another object of the invention is to provide that improved stator sub-assembly in which two pole shoes are properly aligned with the rotor bearings in a timepiece stepping motor and which may be separately assembled to the movement frame.

Still another object of the invention is to provide an improved process for making a laser-cut stator assembly.

SUMMARY OF THE INVENTION

Briefly stated, the invention comprises an improved stepping motor and method of making it including locating it in the timepiece frame, the stepping motor including a rotor and a stator. A flat magnetizable stator member defines a central opening with diametrically opposed narrow sections on either side of the opening, and has a non-magnetic bushing disposed in the opening and secured to the surface of the stator member. The bushing has diametrically opposed cut-out portion aligned with the narrow sections. The narrow sections are severed to separate the stator into two pole shoes which are retained in position by the bushing. The severing is preferably by laser, but may include sawing or other severing methods. The pole shoes of the stator member are then attached to the timepiece frame plate. The stepping motor rotor is journalled in bores formed in the frame and bushing.

DRAWINGS

The invention, both as to organization and method of practice, together with further objects and advantages thereof, will best be understood by reference to the following specification, taken in connection with the accompanying drawings, in which:

FIG. 1 is a top plan view of the improved stepping motor shown in a timepiece movement, looking from the dial side with dial and other portions omitted for clarity, FIG. 2 is a developed, cross-sectional side elevational view, taken along lines II—II of FIG. 1, FIG. 3 is an enlarged partial side elevational view, showing a cross section of the rotor and stator pole shoe region, FIG. 4 is a plan view of the stepping motor stator assembly, FIG. 5 is a side elevational view of the stepping motor stator assembly shown in FIG. 4, FIG. 6 is an enlarged partial, side elevational view of a modification of the invention showing a cross section of the rotor and stator pole shoe region, FIG. 7 is a plan view of the modified stepping motor stator assembly shown in FIG. 6, FIG. 8 is a side elevational view, partly in section, of the modified stepping motor stator assembly shown in FIG. 6, and FIG. 9 is an inverted perspective view of the modified stepping motor stator assembly shown in FIG. 6.

DESCRIPTION OF THE PREFERRED EMBODIMENT

Figure 1:
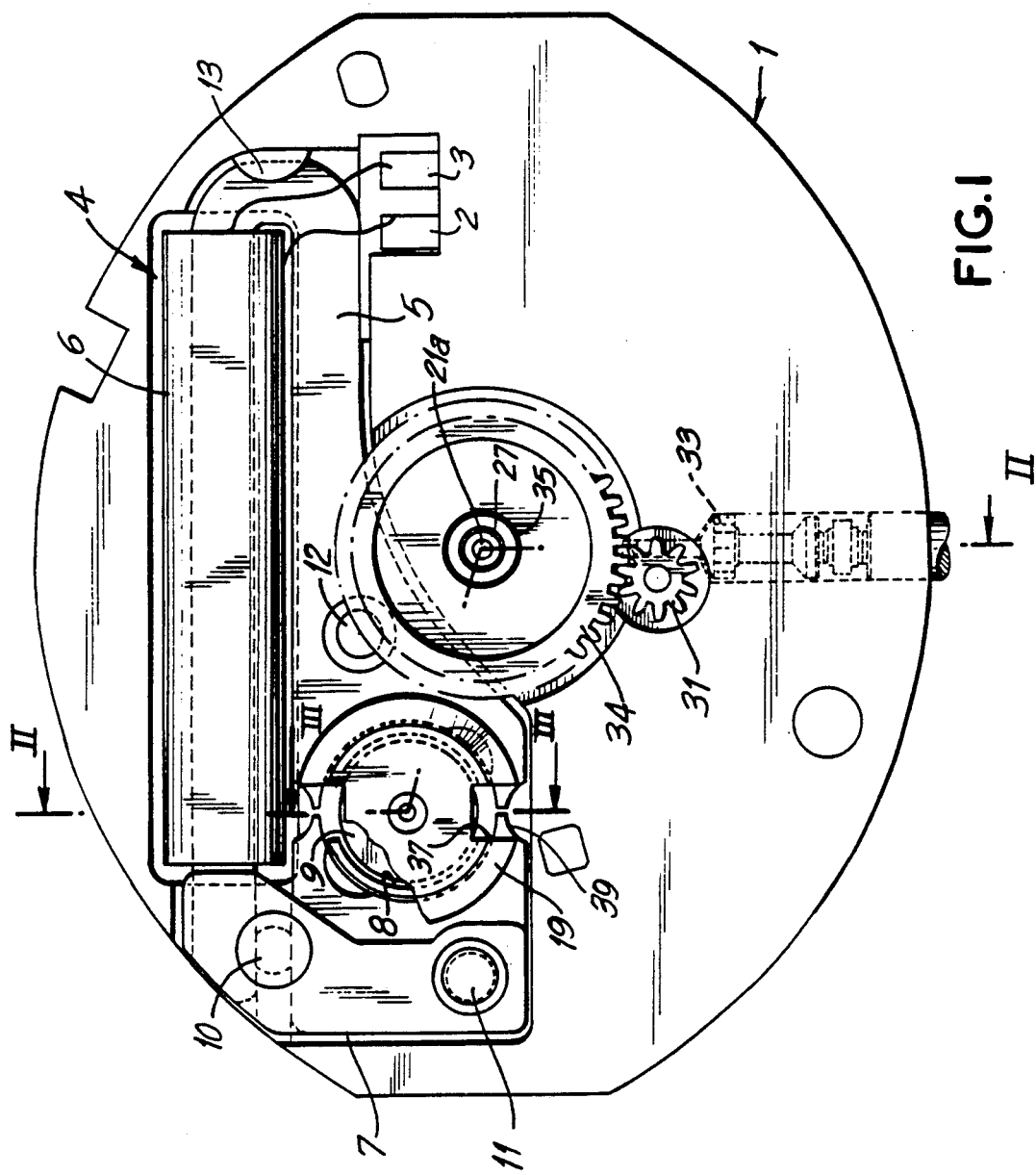

Referring to FIG. 1 of the drawing, the movement is supported in an integral plastic frame member 1 molded as an single piece and having an intricate shape of high precision. A power supply and an integrated circuit (not shown), provide periodic drive pulses from terminals 2, 3 to a stepping motor shown generally as 4. Stepping motor 4 best seen in FIG. 1 comprises a flat U-shaped stator member 5, a coil 6 and a bridge 7. The stator member 5 defines an opening 8 surrounding a stepping motor rotor 9. Stator member 5 is held in frame 1 by upsetting the ends of plastic pegs 10, 11, 12 and by deforming a projection 13, all of which are preferably integral with frame 1.

Referring now to FIG. 2 of the drawing, the frame 1, gear train arrangement and bearing support will be more clearly seen. FIG. 2 is a cross-section elevation view developed along the zig-zag line II—II of FIG. 1. The back side of the frame 1 defines a large circular recess 14 to hold a large diameter lithium energy cell (not shown) to serve as a power supply. Stepping motor rotor 9 comprises a bipolar disc-shaped permanent magnet 15 which is overmolded by plastic material in a shape adapted to support the magnet, as well as to form integral journals 16, 17 and a pair of drive pins 18, which comprise a driving pinion. An ordinary spur gear pinion may also be used. Journal 16 is rotatably supported in a bore 19a in the center of a non-magnetic brass bushing 19 which is affixed to stator member 5. Journal 17 is rotatably supported in a bore 1a in frame 1. The stepping motor stator assembly comprising coil 6, stator member 5, and bushing 19 is preferably pre-mounted in frame 1 as a subassembly together with the rotor 9 before the addition of the gear train components. The stator assembly is attached utilizing pegs, integral with frame 1, such as those shown in FIG. 1 as 10, 11, 12, which extend through holes in the stator 5 and magnetic bridge 7 and which are deformed on the ends by ultrasonic welding. Pegs 10, 11, 12 are precisely located with respect to bore 1a in frame 1, so that the hole 8 in stator 5 will be concentric with bore 1a when the stator assembly is attached to the frame. The frame may also be deformed to form a projection as shown at 13 to lock the stator member of the stepping motor in place.

Although the gear train is not part of the present invention, it may be briefly described. Driving pins 18 on the stepping motor rotor 9 are disposed to alternately engage ogival teeth on the periphery of a toothed center wheel 20. Wheel 20 is frictionally engaged with a slip fit on the end of a center spindle 21 which includes an integral center pinion 22. The friction surface for the slip fit (to allow setting the hands) may be provided either between the spindle 21 and the center wheel 20, or between the adjacent faces of the center wheel 20 and center pinion 22.

Center spindle 21 is rotatably supported in a center bore running through the center of a cylindrical stub 23 extending above frame 1 on the dial side of the timepiece. The timepiece dial indicated at 24 is held (by means not material to the present invention) on top of frame 1 when the movement is assembled in the case. Cylindrical stub 23 extends through an aperture in the dial 24 and extends above the dial.

Center spindle 21 is rotatably supported in frame 1. Center wheel 20, stem 21 and pinion 22 comprise a first rotating assembly to which is affixed minute hand 23 of the timepiece. Pinion 22 drives a second rotating assembly comprising a minute wheel 29, spindle 30 and minute pinion 31. Minute wheel 29 includes a set of leveled crown teeth 32 which may be selectively engaged by a setting gear pinion 33. Minute pinion 31 drives an hour wheel 34 which is rotatably journaled in the frame by means of a collar 35 to which is affixed a timepiece hour hand 36.

Referring now to FIG. 3 of the drawing, the enlarged view shows a cross section of rotor 9, stator 5, frame 1 and bushing 19, taken along lines III—III of FIG. 1. Bushing 19 includes an outer ring 19b and a central annular portion 19c with a bushing bore 19a in the center. Ring 19b has a lower flat surface 19d resting on stator 5 and a depending flange 19e extending into hole 8 in stator 5 with a small clearance.

Frame 1 includes a flat mounting surface 1b on which stator member 5 rests and defines a circular wall 1c extending into opening 8 of the stator with a small clearance and defining a recess 1d with bore 1a in the center of the recess. The outer ring 19b of the bushing has two diametrically opposed cut-out notches 37, 38. The bushing is so located that notches 37, 38 are aligned with the narrow sections 39, 40 of stator member 5 and provide access thereto for severing. See also FIG. 1.

The purpose of cut-out notches 37, 38 is to facilitate severing narrow sections 39, 40 respectively during manufacture of the stator assembly before it is placed into frame 1 as will be explained in connection with the process. The outer ring 19b is located as described above and then permanently secured to stator member 5 by welding as indicated at 41 before stator 5 is severed. The locating pegs 10, 11, 12 will precisely fix the stator 5 and its attached bushing 19 such that bores 1a and 19a will be aligned so as to journal rotor 9 precisely at the center of stator opening 8.

Figure 4:
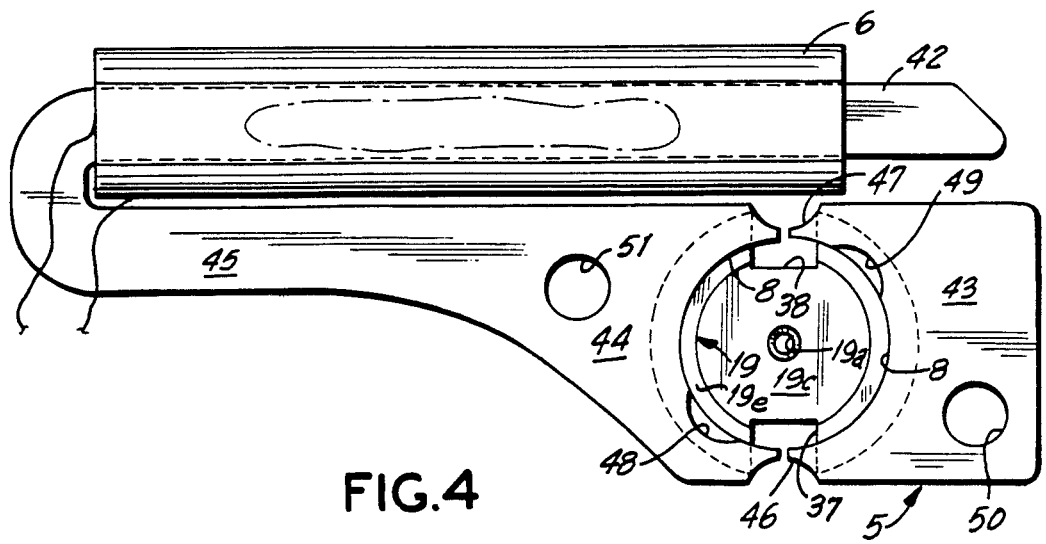
Figure 5:
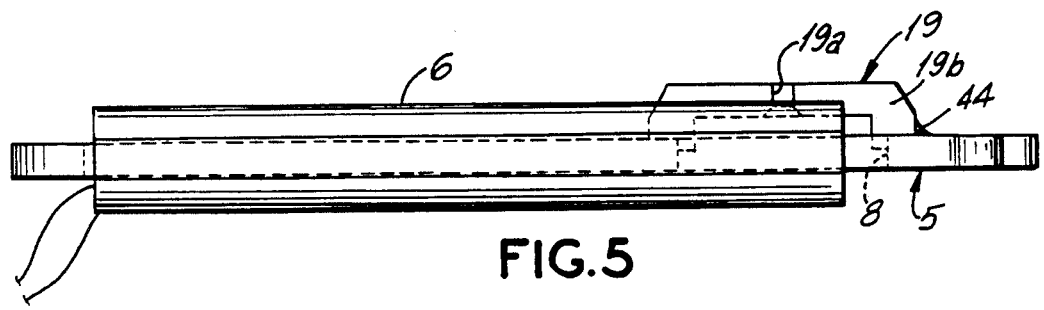

Referring now to FIGS. 4 and 5 of the drawing, the improved stator assembly is shown looking from the opposite or underside of the assembly. Stator member 5 initially is stamped from a one-piece flat sheet of magnetizable material into a u-shaped piece comprising a coil core portion 42, a first pole shoe portion 43, a second pole shoe portion 44 and a connecting portion 45 which joins pole shoe 44 to core 42. The stator member 5 has portions of reduced width at 46, 47 in the flat stamping to provide narrow diametrically opposed sections connecting pole shoe portions 43, 44, which will be severed during the subsequent manufacturing process. The central stator opening 8 is also interrupted at diametrically opposed locations by crescent notches 48, 49 which serve to establish a rotor rest position in a manner wellknown in the art. Locating holes 50, 51 are provided in the stamping to receive pegs 11, 12 (FIG. 1) respectively.

Flange 19e of bushing 19 is placed in stator opening 8 and the bushing is oriented with cut-outs 37, 38 centered on the narrow sections of the stator plate provided by cut-outs 46, 47 respectively. The bushing is then permanently affixed to stator 5 (from the opposite side shown in FIG. 4) by spot welding glueing with epoxy or other similar type of permanent attachment. Next, the diametrically opposed narrow stator sections are severed preferably by a laser. Other suitable methods such as sawing, electrolytic cutting, etc. may be employed, this being facilitated by the cut-out notches 37, 38 in bushing 19. The stator assembly is completed by threading coil 6 over the free end of core 42. Lastly, the stator assembly shown in FIGS. 4 and 5 is preassembled into the movement, along with the rotor 9 by first inserting rotor journal 17 into bore 1a, then placing the stator assembly with the bushing bore 19a over the journal 16 of the rotor and placing the stator assembly to the frame with the stator hole 8 placed over wall 1c, adding bridge member 7 (FIG. 1) and lastly affixing the stator assembly, bridge and rotor in place by deforming pegs 10, 11, 12 and projection 13.

MODIFICATION

In the previously described arrangement, bushing 19 was assembly from the dial side of the timepiece. A modified form of the invention is shown in FIG. 6-9, wherein the timepiece frame member is modified to eliminate the circular wall 1c and wherein the bushing depending flange is extended and provided with a peripheral rim so that the bushing is assembled from the movement side of the timepiece.

Figure 6:
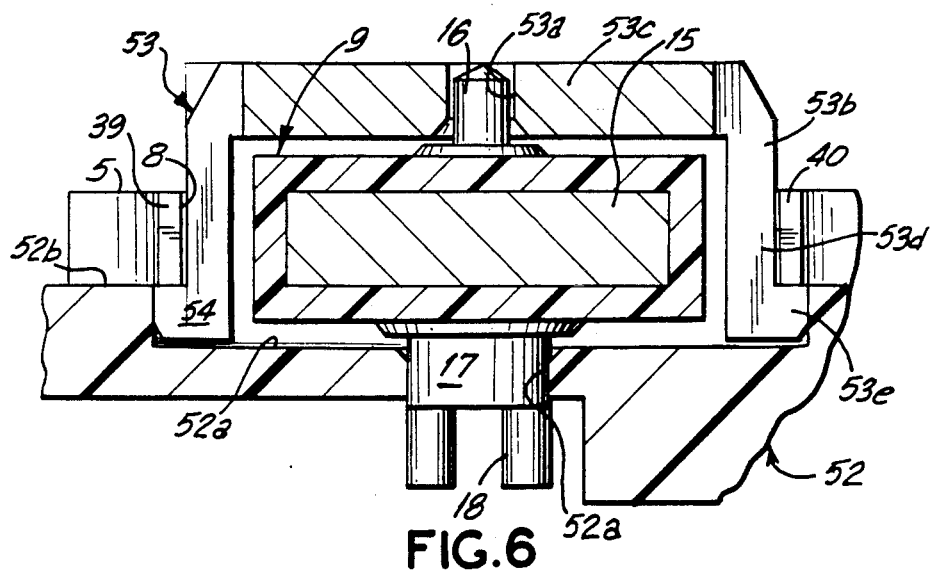

Referring to FIG. 6 of the drawing, an enlarged partial, side elevational view similar to FIG. 3 is shown, wherein the same elements previously described have the same reference numerals. A stator member 52 with a stator bore 52a received journal 17 of rotor 9. The stator frame 52 defines a circular recess 52a and a flat surface 52b surrounding it upon which the stator member 5 rests.

A modified bushing 53 includes an outer ring 53b, a central annular portion 53c with a bushing bore 53a in the center. The outer ring 53b of the bushing includes a depending circular flange 53d extending through the stator opening 8 with a clearance and terminates in a peripheral rim 53e which extends beyond the stator opening 8. The outer ring 53b of the bushing has two diametrically opposed cut-out notches 54, 55 aligned with the narrow sections 39, 40 of stator member 5 and provide access thereto for severing as before Referring now to FIGS. 7 and 8 of the drawing, the modified form of the invention is shown in views similar to FIG. 4 and 5 previously discussed looking from the underside (movement side) of the assembly. The stator member 5 and coil 6 are as previously described. However, the bushing 53 is assembled from the movement side instead of the dial side of the timepiece.

Figure 8:
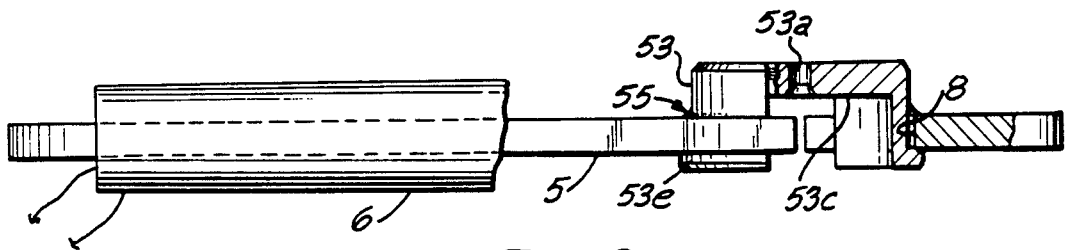

Reference to FIG. 8 of the drawing shows a side elevational view of the stator assembly. Bushing 53 is inserted and bushing bore 53a is located by means of a jig or fixture with the stator 5 so that the bushing bore 53a is precisely in the center of stator opening 8. The bushing is fixed in place by epoxy as indicated at 55. Thereafter, the narrow sections are severed as before, preferably by a laser or other suitable methods such as sawing, electrolytic cutting, etc. This is enable by the cut-out notches 54, 55.

Figure 7:
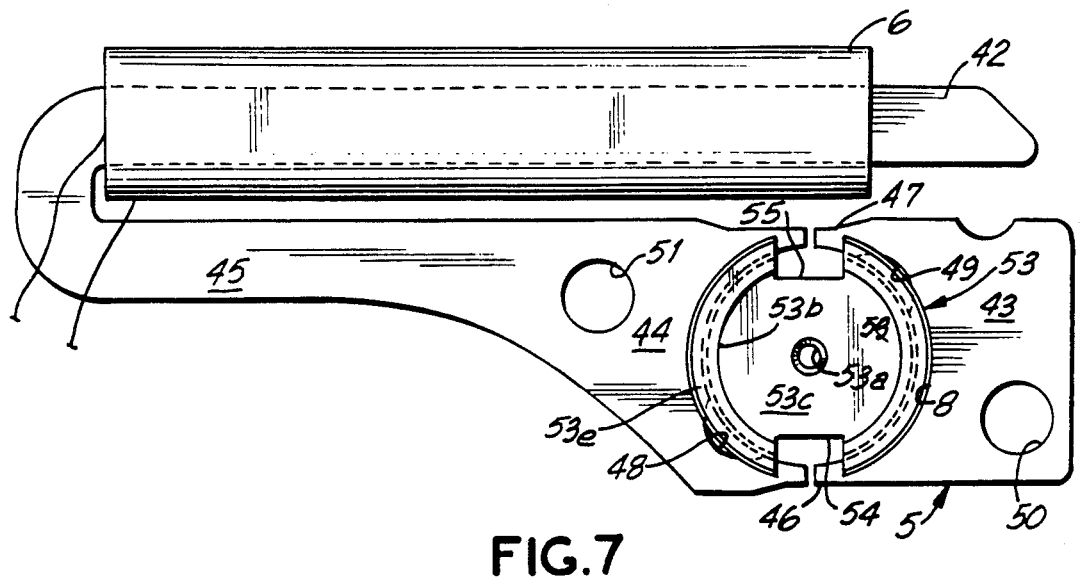
Figure 9:
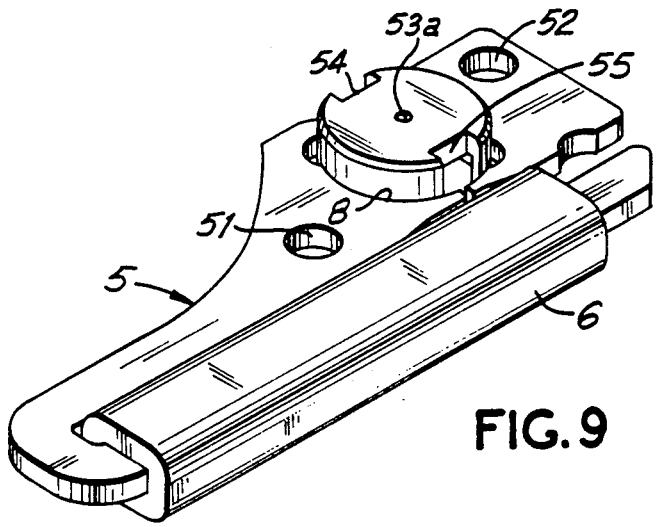

FIG. 9 illustrates the completed stator assembly inverted from the view shown in FIG. 7, as it appears prior to insertion into the frame member. The assembly takes place as previously described by inserting the rotor into the frame, placing the stator assembly shown in FIG. 9 over it, adding bridge member 7 (FIG. 1) and lastly affixing the stator assembly bridge and rotor in place by deforming pegs 10, 11, 12 and projection 13 as shown in FIG. 1.

While there has been described herein what is considered to be the preferred embodiment of the invention, other modifications in the construction and method of making it will occur to those skilled in the art, and it is desired to secure in the appended claims all such modifications as fall within the true spirit and scope of the invention.

I claim:

1. A stator assembly for a timepiece stepping motor adapted to be held in a plastic frame defining stator locating means and a frame bore and having a stepping motor rotor with a pair of journals, one of which journals is adapted to be disposed in said frame bore, comprising:
    a flat one-piece stator member defining a stator opening for said rotor and having a pair of diametrically opposed narrow sections on either side of said stator opening,
    a non-magnetic bushing having an outer ring and a central annular portion defining a bushing bore arranged to receive the other journal of said rotor, said outer ring defining diametrically opposed cut-out notches larger than said stator narrow sections,
    said bushing being located and attached to said stator member so that said cut-out notches are aligned with said narrow sections,
    said narrow sections being severed so as to separate the stator member into two pole shoe portions defining gaps therebetween,
    said rotor being disposed in said stator opening, and
    said stator member being located and attached to said frame so that said bushing bore and frame bore are aligned and journal said rotor coaxially within the stator opening.

2. The stator assembly according to claim 1, wherein said stator member comprises a flat u-shaped stamping of magnetizable material.

3. The stator assembly according to claim 1, wherein said non-magnetic bushing is brass and comprises an outer ring with a central annular portion defining said bushing bore, said cut-out notches being defined in said outer ring.

4. The stator assembly according to claim 1, wherein said outer ring includes a circular depending flange extending into said stator opening, and wherein said frame defines a circular recess, said rotor extending into said recess.

5. The stator assembly according to claim 4, wherein said frame includes a circular wall surrounding said recess, said wall and said circular depending flange being coaxial and extending into said stator opening from opposite sides of the stator member.

6. The stator assembly according to claim 4, wherein said circular depending flange extends through said stator opening and terminates in a peripheral rim extending beyond said stator opening, said peripheral rim being disposed in said recess.

7. A stator assembly for a timepiece stepping motor adapted to be held in a plastic frame defining stator locating means and a frame bore and having a stepping motor rotor with a pair of journals, one of which journals is adapted to be disposed in said frame bore, comprising:

a flat stator member defining a stator opening for said rotor and having a pair of diametrically opposed narrow sections on either side of said stator opening, a non-magnetic bushing having a outer ring and a central annular portion defining a bushing bore arranged to receive the other journal of said rotor, said outer ring defining diametrically opposed cut-out notches larger than said stator narrow sections, said bushing being located and attached to said stator member so that said cut-out notches are aligned with said narrow sections, and said narrow sections being severed so as to separate the stator member into two pole shoe portions defining gaps therebetween.

* * * * *